July 2, 1940.  T. F. SCHLICKSUPP  2,206,731
POULTRY-PLUCKING MACHINE
Filed Nov. 17, 1938  3 Sheets-Sheet 1
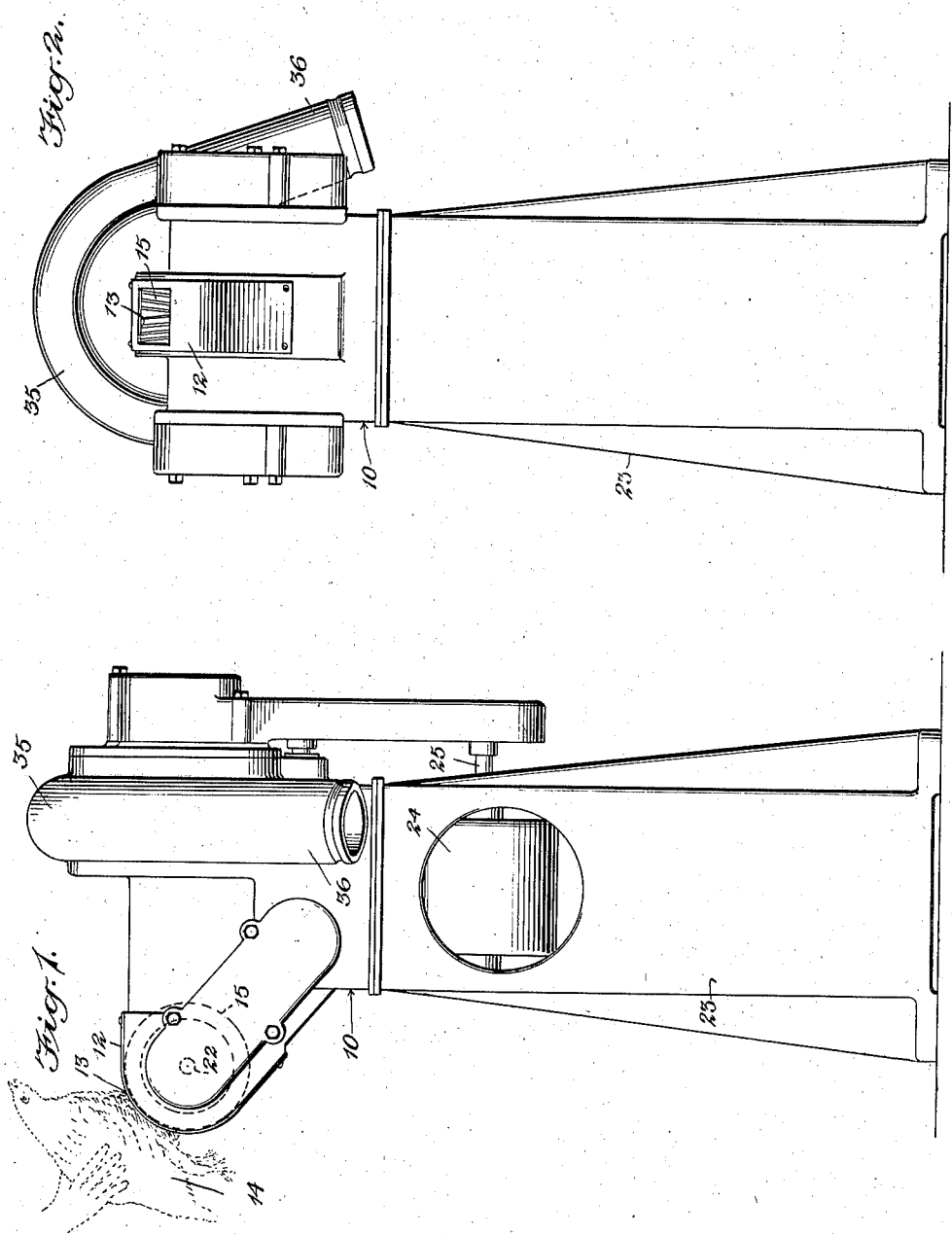
WITNESSES
INVENTOR
Theodor F. Schlicksupp
BY
ATTORNEYS

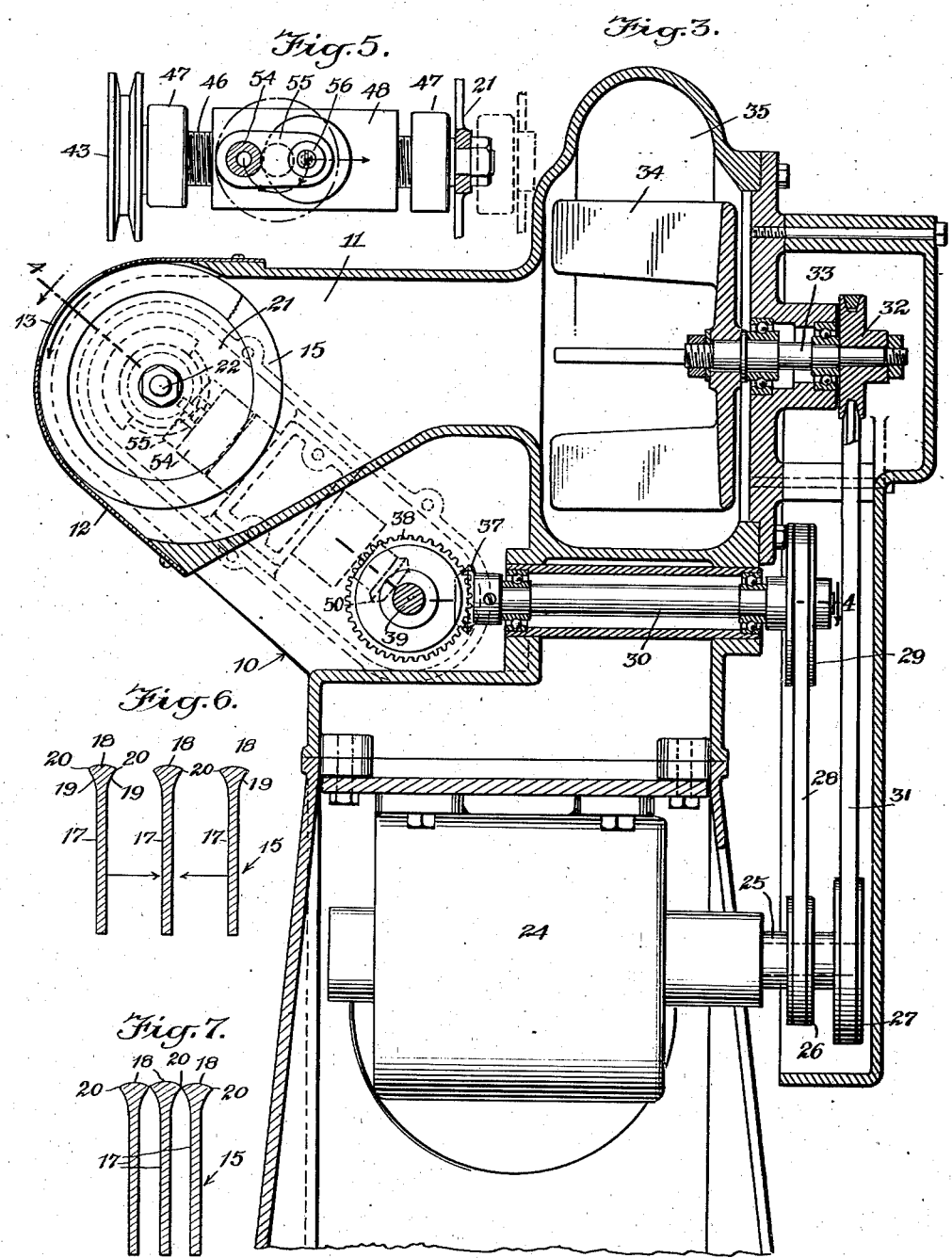

July 2, 1940. T. F. SCHLICKSUPP 2,206,731
POULTRY-PLUCKING MACHINE
Filed Nov. 17, 1938 3 Sheets-Sheet 3

WITNESSES

INVENTOR
Theodor F. Schlicksupp
BY
ATTORNEYS

Patented July 2, 1940

2,206,731

UNITED STATES PATENT OFFICE 2,206,731

POULTRY-PLUCKING MACHINE

Theodor F. Schlicksupp, New York, N. Y.

Application November 17, 1938, Serial No. 240,983

5 Claims. (Cl. 17—11.1)

This invention relates to poultry plucking machines, an object of the invention being to provide an improved construction and arrangement of plucker, and improved means for drawing the plucked feathers away from the plucker and eject the same from the machine.

A primary object of the invention is to provide a plucker which embodies a spiral or convolute device of general cylindrical form which is continuously revolved and which is caused to continuously expand and contract so that upon contraction the feathers of the fowl will be gripped between the convolutions of the plucker and drawn from the body of the fowl, and when the convolutions of the plucker are expanded or separate, the feathers will be released and cared for by the action of a suction fan to remove them from the machine.

The invention embodies many novel features of construction and combination and arrangement of parts, all of which will be more fully hereinafter described and pointed out in the claims.

In the accompanying drawings—

Fig. 1 is a view in side elevation of my improved poultry plucker showing a fowl in operative position relative to the machine;

Fig. 2 is a view in elevation at right angles to Fig. 1 and which may be assumed to be the front of the machine;

Fig. 3 is a view in vertical section on an appreciably larger scale than are Figs. 1 and 2;

Fig. 5 is a view in section on the line 5—5 of Fig. 4;

Fig. 6 is a diagrammatic view showing three of the convolutions of the plucker in separated or expanded positions; and Fig. 7 is a view similar to Fig. 6 showing the convolutions of the plucker in closed or gripping position.

Figure 4:
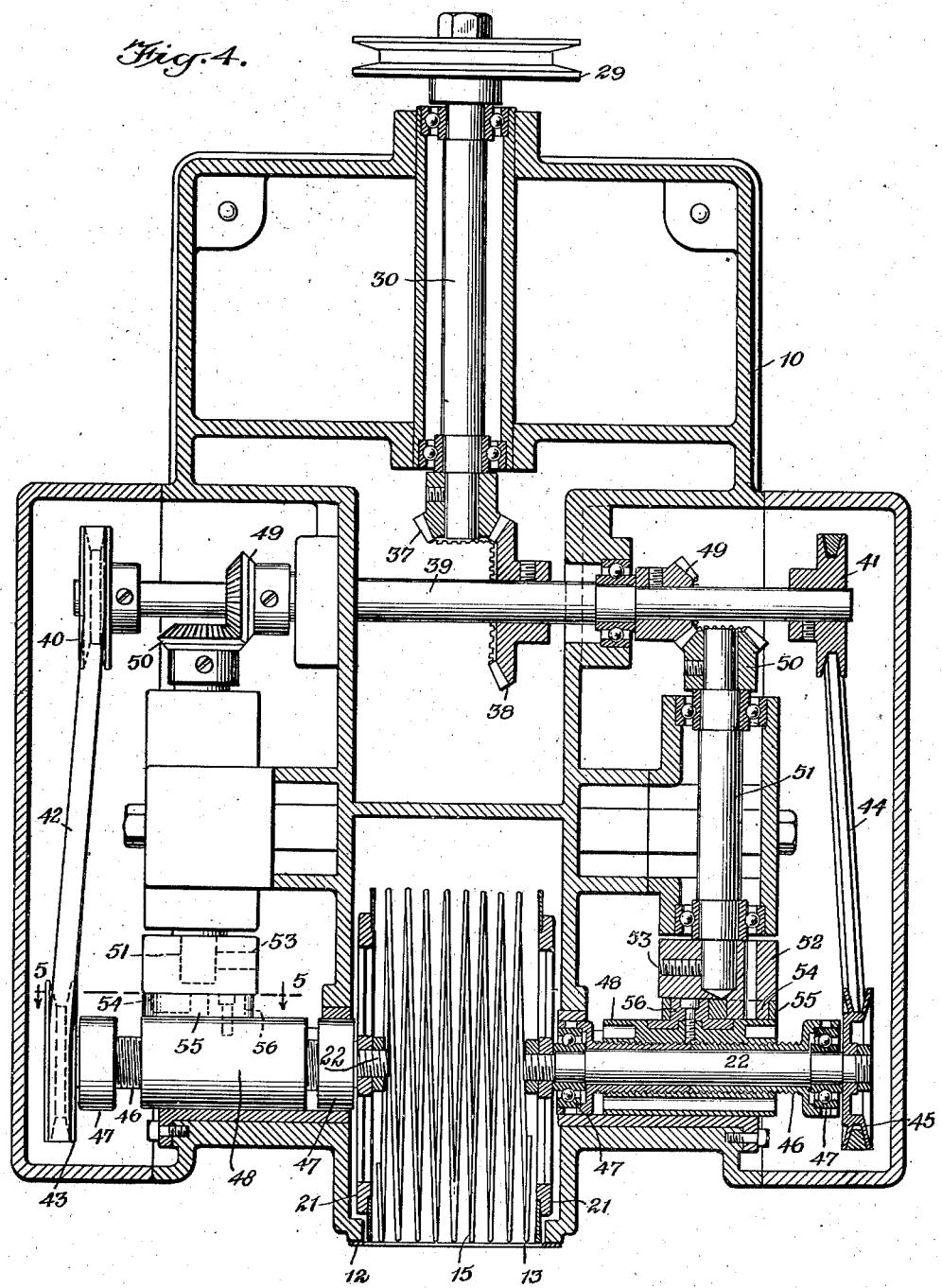
Fig. 4 is an enlarged transverse sectional plan view taken on the staggered line 4—4 of Fig. 3, with the transmitting mechanism at one side of the machine shown in section and the other side in plan.

10 represents the casing of my machine which may, of course, be of any desired shape and of any suitable material with any desired number of parts operatively connected so as to provide mounting and support for the operating mechanism and chambers and compartments for the operating devices. In the upper portion of the casing, and what may be considered the front of the casing, a plucking chamber 11 is provided and a covering guard plate 12 is secured over the open end of the chamber 11 and is formed with an opening 13 through which the feathers of the fowl, indicated by the reference character 14, are projected and exposed to the action of my improved plucker 15.

This plucker 15 is a convolute or spiral device and consists of a strip (or strips) of material, as shown at 17 in Figs. 6 and 7 of the drawings. This strip (or strips) of material is preferably of steel, although it may be of any other suitable material, and at its outer edge is appreciably wider or thicker than the main portion of the strip and on the periphery or outer portion of the strip, the surface is given a convex curvature, as shown at 18, and the sides of the outer portion of the strip are given a concave curvature, as shown at 19. This shape of strip provides relatively sharp gripping edges 20 at both sides of the outer portion of the strip to effectually grip the feathers when the convolutions are brought together which, of course, is the contracted condition of the plucker, so as to effectually grip and draw the feathers from the fowl and when the convolutions are separated, the feathers are released and cared for, as will be hereinafter described.

The plucker in reality consists of two opposite spirals, that is to say, while the strip which forms the spirals is continuous, it forms a right-hand spiral at one side of the center of the plucker and a left-hand spiral at the opposite side of the center of the plucker and when the plucker is revolved in a direction which causes travel of the spirals toward the center of the plucker, it will give a gradual or closing gripping action to the convolutions which will effectually pluck the feathers from the fowl. The ends of the plucker 15 are secured to discs 21 which may be in the nature of open discs or spiders, if desired, and which are secured to the inner ends of aligned shafts 22 mounted in the casing 10, and these shafts are continuously revolved to impart rotary motion to the plucker and are so mounted, as will be hereinafter described, as to permit them to be moved longitudinally toward and away from each other to expand and contract the plucker.

In the casing 10, and preferably in the base portion 23 thereof, I locate a motor 24 which may be an electric motor and the drive shaft 25 of this motor 24 is provided with a pair of pulleys 26 and 27, respectively. An endless belt 28 connects the pulley 26 to a pulley 29 on a horizontal shaft 30 and the pulley 27 is connected by an endless belt 31 with a pulley 32 on a shaft 33 carrying a suction fan 34. This fan 34 is located in a fan casing 35 which communicates with the plucking chamber 11 so as to draw the feathers from the latter chamber and discharge them through an outlet spout 36 into a suitable container or into a hose for directing the feathers to any desired point.

The shaft 30 above referred to at its inner end is connected by beveled pinions 37 and 38, respectively, to a transverse shaft 39 and this transverse shaft 39 at its ends has pulleys 40 and 41, respectively, secured thereto. The pulley 40 is connected by an endless belt 42 to a pulley 43 on the shaft 22 at one side of the machine and an endless belt 44 connects pulley 41 to pulley 45 on the shaft 22 at the opposite side of the machine.

This transmission mechanism above described imparts a continuous rotary motion to the plucker 15. Motion is transmitted to the shafts 22 to reciprocate them in opposite directions and as this transmission mechanism is precisely alike at both sides of the machine except that certain portions of the transmission are oppositely disposed. A detailed description of one of these mechanisms will apply alike to both.

Each shaft 22 is mounted in a housing 46 which is provided with suitable anti-friction bearings 47 in which the shaft 22 revolves. The shaft 22 is so mounted in its housing that it will be capable of free rotary motion but is held by the housing against any longitudinal movement. This housing 46 is in reality in two parts in the form of two sleeves externally screw threaded and engaging internal screw threads in a sleeve 48 around the same, so that by reason of this screw threaded engagement of the two-part housing with the sleeve, the housing is capable of adjustment in the sleeve so that the desired longitudinal movement of the shaft against the longitudinal movement of the plucker convolutions may be adjusted so as to give the best results.

The shaft 39 above referred to is connected by beveled pinions 49 and 50 with a shaft 51 extending from the rear to the front of the machine and provided at its forward end with a head 52 fixed thereon, preferably by means of a set screw 53. This head 52 is formed with a crank pinion 54 connected by a link 55 with a crank pin 56 on the sleeve 48 so that when the shaft 51 is revolved, the mechanism above described, including the link 55 and the crank pins 54 and 56, will impart a reciprocating motion to the shafts 22 and thus cause them to move toward each other to contract the plucker and bring the convolutions together to grip the feathers of the fowl and to cause the plucker to expand to separate the convolutions of the plucker and release the feathers, which are then carried away through the medium of the suction fan as stated heretofore.

Attention is particularly called to the fact that the opening 14 in the covering plate 12 is of a length to uncover only a relatively small portion of the circumference or outer edge of the plucker and it is to be noted that when the convolutions of the plucker pass this opening they are about to come together and are completely together as they reach the lower end of the opening. Thus, the convolutions provide entrance between them for the feathers, but this entrance or entrances is quickly closed to effectually grip the feathers and pluck them from the fowl.

It will be noted by reference to the drawings that all the several shafts of the machine are mounted in suitable antifriction bearings to reduce friction to a minimum, and the casing is so shaped as to result in economy of space and give compactness to the machine as a whole.

While I have illustrated and described what I believe to be the preferred embodiment of my invention, it is obvious that various changes may be made with regard to the form and arrangements of parts without departing from my invention, and hence, I do not limit myself to the precise details set forth but consider myself at liberty to make such changes and alterations as fairly fall within the spirit and scope of the claims.

I claim:

1. A poultry plucking machine including a casing, a rotary convolute plucker mounted in the casing, means for continuously revolving the plucker, means for continuously expanding and contracting the plucker to bring the convolutions of the plucker together to grip the feathers and to separate the convolutions to release the feathers, aligned shafts at the respective ends of the plucker, discs on the shafts secured to the ends of the plucker, reciprocating housings in which said shafts are mounted, a pair of drive shafts, crank pins on the drive shafts, and links connecting the crank pins to the housings so that said housings are caused to reciprocate and contract and expand the plucker.

2. A poultry plucking machine including a casing, a rotary convolute plucker mounted in the casing, means for continuously revolving the plucker, and means for continuously expanding and contracting the plucker to bring the convolutions of the plucker together to grip the feathers and to separate the convolutions to release the feathers, said convolutions being formed by a strip of metal having its outer edge appreciably wider than the main portion of the strip and presenting sharp edges from one convolution to another.

3. A poultry plucking machine including a casing and a rotary plucker in the casing comprising two aligned oppositely coiled spirals fixedly connected, means for imparting rotary motion to the plucker, and means for expanding and contracting the plucker.

4. A poultry plucking machine including a casing and a rotary plucker in the casing comprising two aligned oppositely coiled spirals fixedly connected, means for imparting rotary motion to the plucker, and means for expanding and contracting the plucker, said plucker being caused to revolve in the direction of power transmission by both spirals toward the center of the plucker.

5. A poultry plucking machine including a casing and a rotary plucker in the casing comprising two aligned oppositely coiled spirals fixedly connected, means for imparting rotary motion to the plucker, and means for expanding and contracting the plucker, said plucker being caused to revolve in the direction of power transmission by both spirals toward the center of the plucker, said spirals consisting of strips having widened portions at their outer edges so as to provide relatively sharp feather gripping portions.

THEODOR F. SCHLICKSUPP.